(No Model.) 2 Sheets—Sheet 1.
R. S. MUDFORD.
GIN SAW FILING MACHINE.
No. 520,966. Patented June 5, 1894.
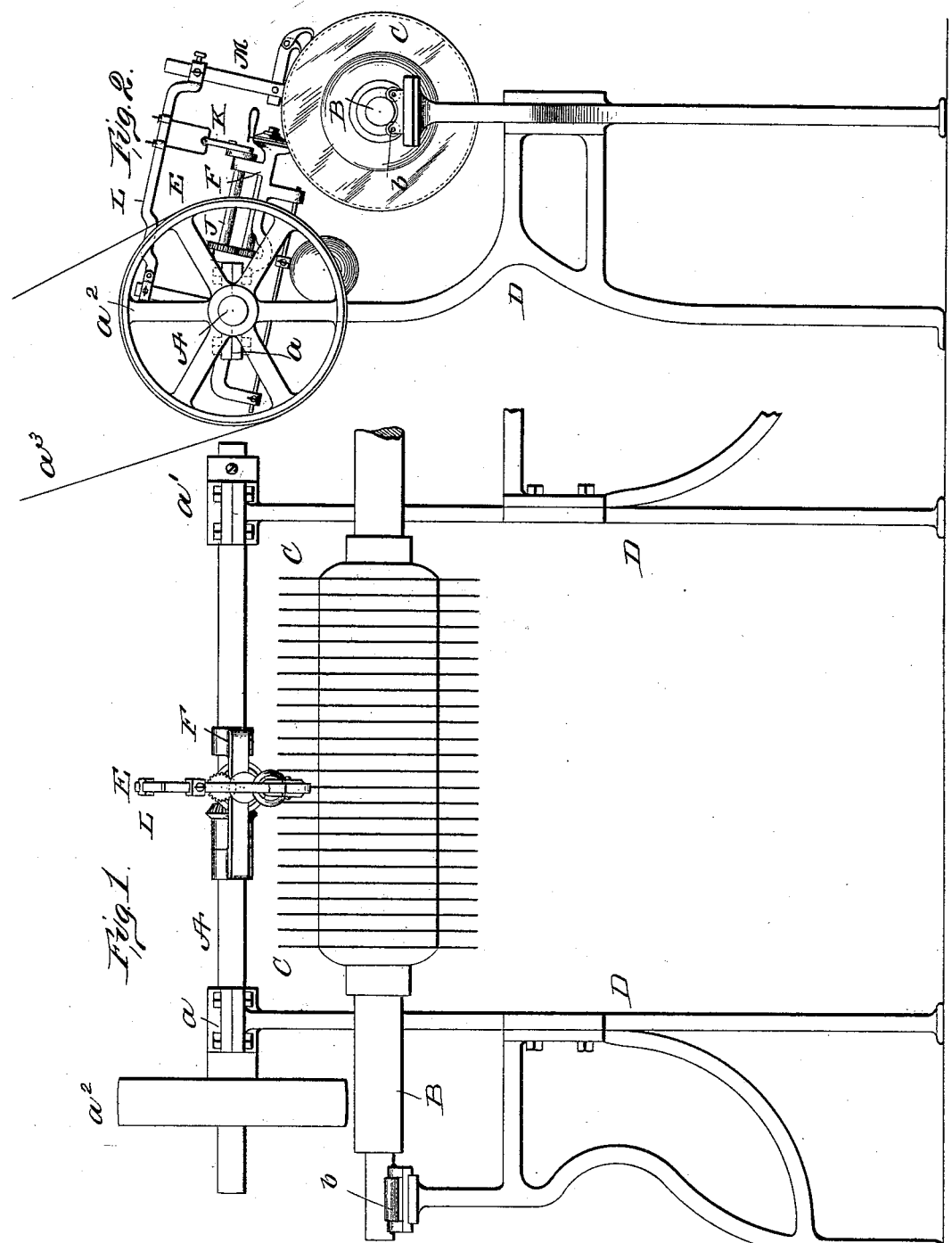

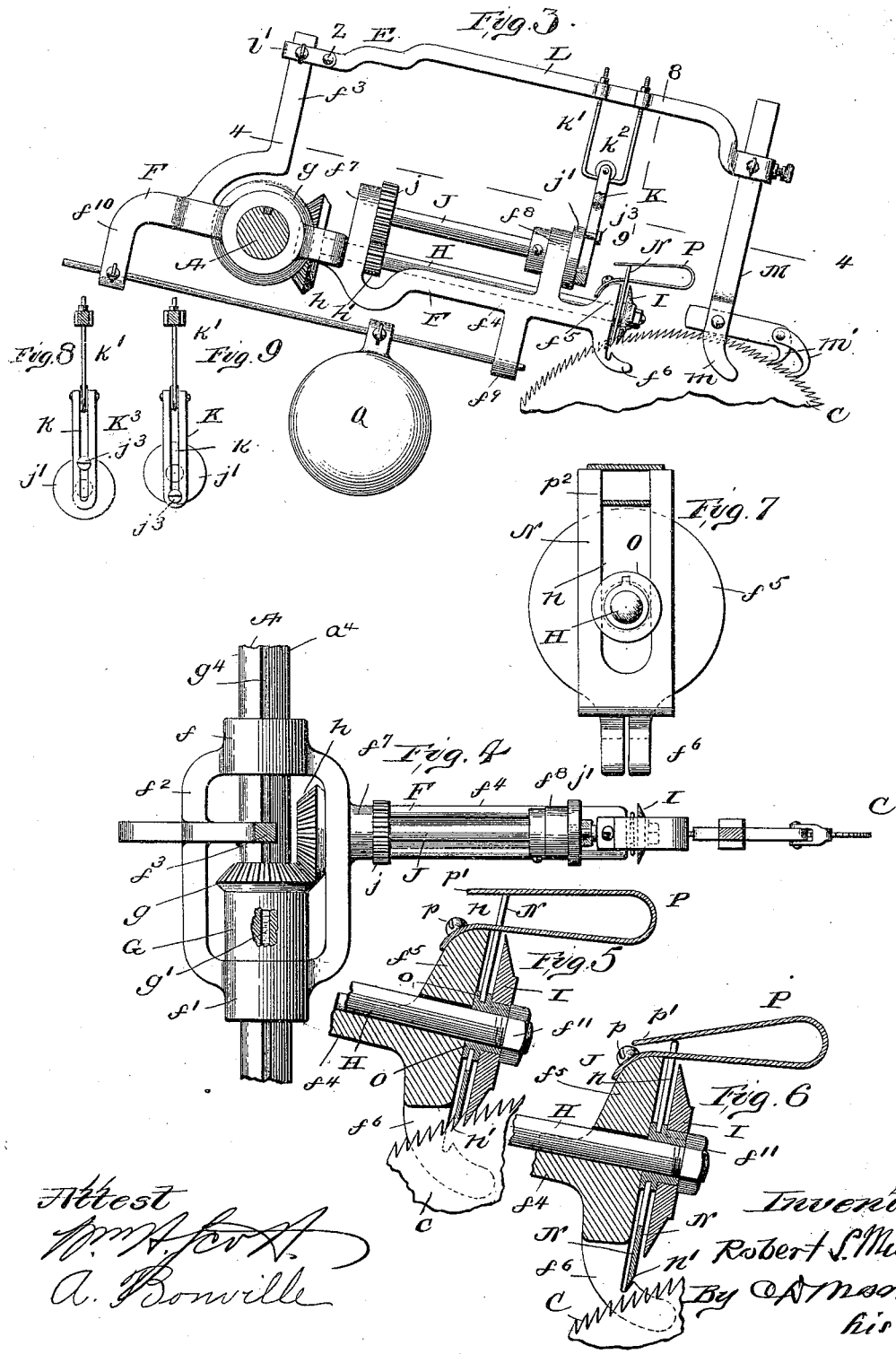

UNITED STATES PATENT OFFICE.

ROBERT S. MUDFORD, OF TEXARKANA, ARKANSAS.

GIN-SAW-FILING MACHINE.

SPECIFICATION forming part of Letters Patent No. 520,966, dated June 5, 1894.

Application filed August 5, 1893. Serial No. 482,454. (No model.)

*To all whom it may concern:*

Be it known that I, ROBERT S. MUDFORD, of Texarkana, Arkansas, have made a new and useful Improvement in Gin-Saw-Filing Machines, of which the following is a full, clear, and exact description.

The filing-machine, or filer as it may be termed, under consideration is connected with a revolving, horizontally-arranged, shaft, which, in conjunction with the saws being filed, constitutes the support, and whose motion effects the operation of the filer, and, in carrying out the invention, provision is made for holding the gin-saw shaft, with the saws attached, in a position parallel with the driving shaft, and so that the saws can be acted upon by the filer, and coact therewith. The frame of the filer is mainly an arm journaled upon the driving-shaft, and extending thence to the saw being filed, and supporting a shaft carrying a rotary file which acts upon the tooth of the saw. The file-shaft derives its motion from the driving-shaft, and the file-shaft motion is also utilized to effect the feeding of the saw-teeth in succession to the file, until the sharpening of a saw is completed. The filer is then shifted laterally upon the driving-shaft, and the described operation repeated with the next saw upon the gin-saw shaft, and so on until all of the saws in the gang are operated upon; all substantially as is hereinafter set forth and claimed, aided by the annexed drawings, making part of this specification, in which—

Figure 1 is a front elevation of the filer, with the saw-shaft and saws in position; Fig. 2 an end elevation of the same; Fig. 3 a side elevation, partly in section, upon an enlarged scale, of the filer, including a portion of a saw; Fig. 4 a section on the line 4—4 of Fig. 3; Figs. 5 and 6 central, vertical, sections of the file and the parts immediately therewith associated, and showing, respectively, the file in, and out of, engagement with the saw;
Fig. 7 an elevation, from the outer end thereof, of the shaft which carries the file; the file is omitted from the view but the file-gage is shown and the outer end of the arm which constitutes the main portion of the frame of the filer, and the spring which actuates the gage is shown in section; and Figs. 8 and 9 sections on the line 8—9, Fig. 3, showing, respectively, different positions of the crank and associated part.

The same letters of reference denote the same parts.

A represents the driving-shaft. It is journaled in bearings $a$, $a'$, and is provided with a pulley $a^2$ to receive a belt $a^3$ to enable it to be suitably rotated.

B represents a gin-saw shaft and C C the saws thereon. The shaft B is arranged parallel with the shaft A, and, at its ends, is journaled in bearings such as $b$ to enable it to be rotated to present the saw-teeth in succession to the file. Any suitable means, such as the frame D for instance, may be employed to sustain the shaft B, or both the shafts B and A, substantially as shown.

E represents the filer. Its frame consists largely of an arm F. This arm is journaled on the shaft A at $f$ and $f'$ and between its bearings it assumes the form of a yoke $f^2$, substantially as shown, and from the rear side of the yoke rises a standard $f^3$, and from the front side of the yoke the arm extends forward substantially as shown at $f^4$, terminating in a boss $f^5$, and the forked projection $f^6$: between the fork and the boss, and upon the upper side of the arm, are standards $f^7$, $f^8$, and, on the under side of the arm, is a projection $f^9$, and from the rear side of the yoke the arm extends backward and downward to form the projection $f^{10}$. A sleeve, G, provided with the miter-pinion $g$, encircles the shaft A: by means of the key $g'$ in the sleeve and the groove $a^4$ in the shaft A the sleeve can be slipped along the shaft A, but be rotated therewith in all of its adjustments. The pinion $g$ engages with a miter-pinion $h$ that is attached to a shaft H that extends through the front side of the yoke, and above the arm-portion $f^4$, and through the boss $f^5$, and journaled at various points, substantially as indicated, in the arm. The motion of the shaft A is thus communicated to the shaft H and to the rotary, disk-like, file I, which is secured to the shaft H at the forward end thereof.

J represents another shaft journaled in the standards $f^7$, $f^8$, and provided with a pinion $j$ and a crank $j'$. The pinion $j$, engages with a pinion $h'$ on the shaft H and the shaft J is thereby driven from the shaft H.

All the various gears described may be relatively constructed to enable the shafts H J to be rotated at suitable speeds, and I desire not to be restricted to the proportion shown.

The arm F reaches to the saw, C, being filed and during its filing the saw is between the forks of the projection $f^6$, and, to file a saw-tooth, the arm F is dropped to bring the file I into contact with it as shown in Figs. 3 and 5, and the filing is accomplished by rotating the file as described.

The automatic raising of the file away from the tooth when sharpened, and the feeding of the saw-teeth successively into position to be filed, and the guiding of the file into position to operate, are features of the invention which will be described. The shaft J is provided as stated, with a crank $j'$. It engages with a slotted rod K that in turn is connected with a bar L. This last named part is sustained above the arm F and shaft J, and preferably by means of the standard $f^3$ and the pawl carrier M, which, as seen, rests upon the saw C. The parts described are so relatively constructed and arranged, that the wrist-pin $j^3$ of the crank $j'$ when, in rotation of the shaft J, it is carried down to bear upon the lower end of the slot $k$ in the rod K, is not yet at the downward limit of its stroke. The support, namely the bar L, of the rod K however cannot yield, and the consequence is the arm F, and all the parts sustained by the arm, are turned upon the shaft A sufficiently to lift the file out of the saw and into the position shown substantially in Fig. 6. This leaves the saw to be turned to bring the next tooth in it into position to be acted upon by the file, and its turning is accomplished by the same described action of the crank-pin upon the slotted rod and consequent tilting upward of the forward portion of the arm F. For, while the bar L cannot yield downward to keep the arm F from tilting sufficiently to disengage the file, it is, by reason of its connection with the standard $f^3$, drawn endwise, or substantially endwise, and this endwise movement causes the hooks on the pawl carrier to turn the saw the desired distance, and to feed the next tooth into position beneath the file, and this action is repeated at every revolution of the shaft J, and it is only necessary to accomplish the rotation of the shaft J as soon as a tooth has been sufficiently filed. The preferable form of the pawl carrier M is shown; its lower end $m$ is forked and rests upon the saw, and it is provided with one, two or more hooks or pawls, $m'$, which engage with the saw-teeth as shown, thereby providing a rest in a vertical direction for the pawl carrier, and for a hold upon the saw when the bar L is drawn endwise as described. The bar L is jointed at $z$ to a strap $l'$ which in turn is attached to the standard $f^3$. Said strap can be raised or lowered upon the standard to enable the bar L to be drawn a greater or a shorter distance to suit the distance the saw-teeth are spaced apart. The rod K is connected with the bar L by means of the stirrup $k'$. The rod has a roller-connection $k^2$ with the stirrup to provide for the change in the relative position of the parts as the arm F is tilted. The joint $z$ in the bar L is for an analogous purpose. The guiding of the uplifted file into position to act properly upon the next saw tooth is an important matter, and it is accomplished by means of a guide N and the parts therewith coacting and shown more distinctly in Figs. 5 and 6. The guide N, in its preferred form, is a plate slotted at $n$ to pass onto and to be moved up and down on a collar O, on the shaft H, substantially as is indicated by its various positions. The collar, O, is applied to the shaft between the boss $f^5$ and a nut $f^{11}$ on the end of the shaft. That is, the collar is preferably extended to carry the file which is suitably keyed to the collar, and the collar is suitably keyed to the shaft to rotate with it, and the collar is grooved at $o$ to receive the guide so that the guide may be kept apart from the boss and file as shown. The guide at its lower end, $n'$, is shaped to accurately fit a properly-sharpened tooth. A spring, P, fastened at $p$ to the boss, $f^5$, exerts a tension by means of its free end $p'$ upon the guide and when the guide is free to move downward, the spring acts to move it downward from its position shown in Fig. 5, into that of Fig. 6. The spring is preferably made to pass through the guide-slot at $p^2$, and thereby act as a guide for the guide, and is then widened to bear upon the top of the guide as shown. The action of the guide is as follows: When the arm F is down to bring the file into engagement the lower end of the guide encounters the saw, entering the space in front of the previously sharpened tooth, and the free end of the spring P is forced upward, substantially as shown in Fig. 5. When the arm F is lifted, and the lower end of the guide is thereby no longer supported by the saw, the spring P acts to force the guide downward upon the collar O, and the lower end of the guide is thereby advanced below the lower edge of the file, substantially as shown in Fig. 6. The arm F now drops again, and the point of the guide being above a properly-formed space in front of a sharpened tooth enters that space and thereby guides the file correctly into position to act upon the next tooth which is more or less out of space, and perhaps broken. But, owing to the previous accurate placing of the guide, the file is always properly directed.

The guide and file, by any suitable means, are spaced apart from each other to suit the spaces between the saw-teeth.

It is desirable to be able to regulate the pressure of the file upon the saw, and to that end, and as the most desirable means, an adjustable weight Q is employed. It is suspended from a rod held by the arm F, and preferably in the projections $f^9$, $f^{10}$. The weight can be slipped along the rod and secured at the proper point thereon. If more pressure is required the weight is moved toward the saw; if less pressure is needed the weight is moved in the opposite direction.

I claim—

1. The file-shaft carrying the file in combination with the spring actuated guide, for the purpose described.

2. The combination of the file-shaft, the file, the boss, the grooved collar, the slotted guide, and the spring, substantially as described.

3. The combination of the arm having the boss, the forked projection at the lower end of the boss, the file-shaft, the file, the grooved collar, the slotted guide, and the spring, substantially as described.

4. The combination of the file shaft and file, the shaft-carrying arm, mechanism for rotating the shaft and raising the arm to throw the file out of action, and the automatically adjustable guide; substantially as described.

5. The combination of the drive shaft, the file-shaft carrying arm, the drive pinion splined upon the drive shaft, the miter pinion on the file shaft, and the adjustable yoke on the inner end of the carrying arm, said yoke being sleeved upon the drive shaft; substantially as described.

6. The combination of the drive shaft, the tilting arm, the file shaft and file carried by the arm, mechanism for driving the file shaft from the drive shaft, and mechanism for periodically raising the arm to throw the file out of action, said raising mechanism being driven by the file shaft; substantially as described.

7. The combination of the driving shaft, the bearings for the saw-shaft, the tilting frame sustaining the file, the rod underlying the frame and the adjustable weight carried by the rod, for regulating the file-pressure, substantially as described.

8. The combination of the driving-shaft, the tilting-arm, the file-shaft driven from the driving-shaft, the crank-shaft driven from the file-shaft, the overhead support, the pawl, and the slotted rod connecting said crank shaft and overhead support, substantially as described.

9. In a saw filer, the combination of the driving shaft, the tilting arm, the file shaft carried by the arm, the standard rising from the arm, the overhead bar jointed to the standard, the pawl carrier and pawl, and mechanism interposed between the file shaft and the overhead bar whereby the arm is automatically tilted; substantially as described.

10. The combination of the driving-shaft, the tilting arm having the standard, the pawl carrier and pawl, the bar connecting said pawl carrier and standard, the crank-shaft the slotted rod, and the stirrup, substantially as described.

11. The combination of the driving-shaft, the tilting arm, the file-shaft carrying the file and driven from said driving shaft, the crank-shaft driven from said file-shaft, the overhead support, the rod connecting said crank-shaft and overhead support, the pawl carrier and pawl, and the file-guide, substantially as described.

Witness my hand this 31st day of July, 1893.

ROBERT S. MUDFORD.

Witnesses:
C. D. MOODY,
A. BONVILLE.